United States Patent [19]

Funada et al.

[11] 4,431,270

[45] Feb. 14, 1984

[54] ELECTRODE TERMINAL ASSEMBLY ON A MULTI-LAYER TYPE LIQUID CRYSTAL PANEL

[75] Inventors: Fumiaki Funada, Yamatokoriyama; Toshiaki Takamatsu, Tenri; Shuuhei Yasuda, Tenri; Masataka Matsuura, Tenri, all of Japan

[73] Assignee: Sharp Kabushiki Kaisha, Osaka, Japan

[21] Appl. No.: 188,562

[22] Filed: Sep. 18, 1980

[30] Foreign Application Priority Data

Sep. 19, 1979 [JP] Japan ................. 54-121276
Feb. 28, 1980 [JP] Japan ................. 55-24931

[51] Int. Cl.³ ............................ G02F 1/13
[52] U.S. Cl. ....................... 350/332; 350/335; 350/336
[58] Field of Search ............ 350/333, 334, 335, 336, 350/332

[56] References Cited

U.S. PATENT DOCUMENTS

| | | |
|---|---|---|
| 3,718,842 | 4/1972 | Abbott et al. ............... 350/334 X |
| 3,936,815 | 2/1976 | Kogure et al. .............. 350/333 X |
| 4,145,120 | 3/1979 | Kubota ........................ 350/332 |
| 4,165,607 | 8/1979 | Fedorowicz et al. ........ 350/334 X |
| 4,260,224 | 4/1981 | Takayama .................. 350/334 X |
| 4,295,711 | 10/1981 | Tanaka et al. ............... 350/334 |

Primary Examiner—John K. Corbin
Assistant Examiner—Richard F. Gallivan
Attorney, Agent, or Firm—Birch, Stewart, Kolasch & Birch

[57] ABSTRACT

In a multi-layer matrix type liquid crystal display panel having a stack of liquid crystal display cells and matrix electrodes provided for respective ones of the liquid crystal display cells, the supports of the respective liquid crystal display cells are piled sequentially, one on top of the other, with a first dimension sequentially longer and a second dimension sequentially shorter, thereby allowing enough room on all sides for electrode connections. A rigid circuit board has terminals which are located in a complementary fashion with respect to the terminals of the display panel. The opposing terminals of the display panel and the circuit board are connected through a flexible sheet.

7 Claims, 21 Drawing Figures

ELECTRODE TERMINAL ASSEMBLY ON A MULTI-LAYER TYPE LIQUID CRYSTAL PANEL

BACKGROUND OF THE INVENTION

The present invention relates to a high density intelligence display such as a matrix type liquid crystal display panel with a matrix electrode structure having crossing strip electrodes, and more particularly to a terminal connection structure for such a display panel.

In recent years, a substantial amount of effort has been devoted to the field of liquid crystal matrix displays to accomplish a high-density multiline display, aiming at an improvement in image quality. Liquid crystal displays with matrix shaped electrode structures are quite favorable to fulfill a power saving demand because of their capability of being excited with low power consumption.

Figure 1:
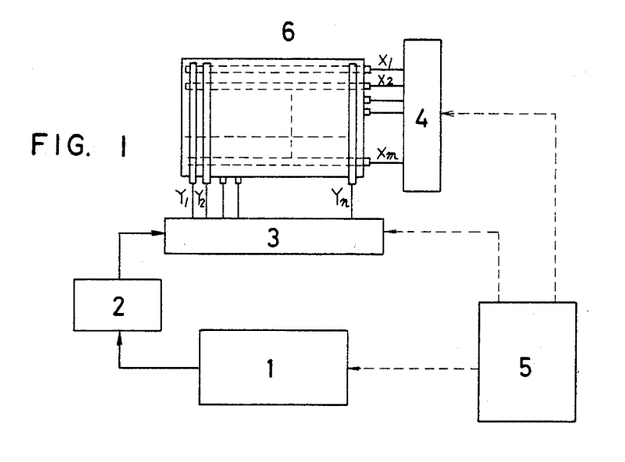
FIG. 1 is a schematic block diagram of a basic structure of the prior art matrix type liquid crystal display panel.

A conventional drive technique for such a matrix type liquid crystal display, for example, the line sequential drive method as shown in FIG. 1, is known. A main memory 1 stores characters, symbols, patterns or the like and an intelligence signal converter 2 converts data contained in the memory 1 into associated display patterns. After those patterns are stored line by line into a buffer memory in a column driver 3, respective column electrodes $Y_1, Y_2, \ldots Y_n$ are supplied with those patterns. Row electrodes $X_1, X_2, \ldots X_m$ crossing the column electrodes, on the other hand, are sequentially enabled through a row driver 4, thereby displaying information contained in the buffer memory in a line-by-line fashion. A control 5 provides an operation control for the row and column driver circuits. A liquid crystal display with a matrix type electrode structure is labeled 6.

For the matrix type liquid crystal display panel, the greater the number of the rows (scanning line number), the higher the density and accuracy of display. However, with an increase in the number of the rows, the length of time during which a signal is applied to each, the duty factor, would be shortened and crosstalk takes place. In particular, liquid crystal display panels show dull threshold characteristics and slow response characteristics, resulting in difficulty in assuring a satisfactory contrast. There have been several attempts to overcome the problem.

Figure 2A:
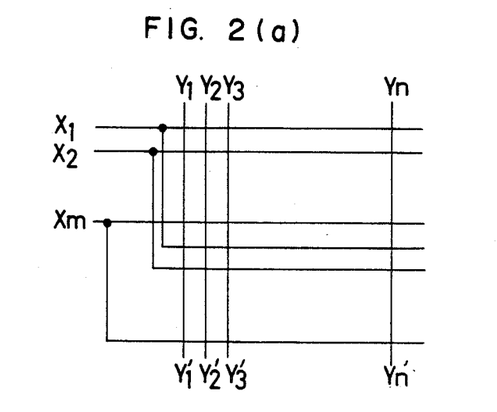
FIGS. 2(a) and 2(b) are schematic views of improved matrix electrode structures.
Figure 2B:
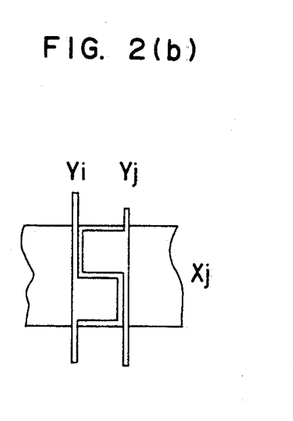

(1) The development of liquid crystal material having more definite threshold properties;

(2) A matrix address scheme in the optimum condition with an extended operating margin ($\alpha = -V_{on}/V_{off}$); and (3) The design of a new electrode layout with a higher resolution. For example, as shown in FIG. 2(a), column electrodes are divided into the upper half $Y_1, Y_2, \ldots Y_n$ and the lower half $Y_1', Y_2', \ldots Y_n'$ while line electrodes $X_1, X_2, \ldots X_m$ are operatively associated in common with the upper and lower halves. An alternative way, shown in FIG. 2(b) is that two adjacent line electrodes $Y_i$ and $Y_j$ are of a comb-tooth shape to mesh with each other within the area of a respective one of line electrodes $X_j$.

Although the first two methods (1) and (2) do not require modifications to the liquid crystal cell structure, it is not possible to increase, remarkably, the number of actuable line electrodes. In contract, the last method (3) can surely obtain an increased number of actuable or useful line electrodes but suffer from complexity of cell structure.

It is therefore an object of the present invention to provide an improved liquid crystal display panel where an electrode lead scheme is relatively easy to manufacture and handle.

BRIEF DESCRIPTION OF THE DRAWINGS

For a more complete understanding of the present invention and for further objects and advantages therof, reference is now made to the following description taken in conjunction with the accompanying drawings, in which.

DETAILED DESCRIPTION OF THE INVENTION

There are two possible types of matrix type liquid crystal display panels capable of implementing the electrode layout shown in FIG. 2(a). One way is to split all the line electrodes into an upper group and a lower group within the same cell structure (the upper and lower division type) and the other way is to stack two liquid crystal cells on top of each other (the two-layer matrix type). The present invention is primarily concerned with the latter type or the two-layer matrix type.

Figure 3:
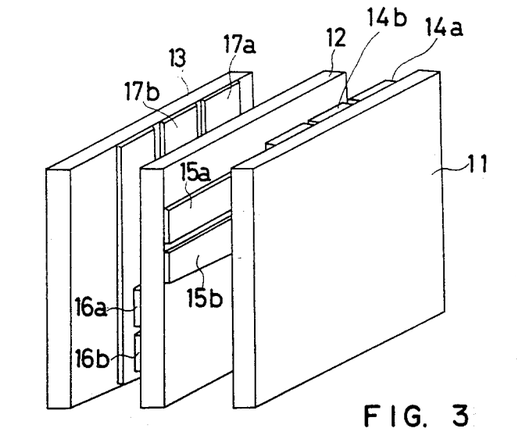
FIG. 3 is a perspective view of a two-layered structure matrix type liquid crystal display panel.

As more clearly shown in FIG. 3, the two-layer matrix type cell comprises, in general, a first transparent support 11, a second transparent support 12 and a third support 13 disposed in that order from the viewing side. While the first support 11 carries column electrodes 14$_a$, 14$_b$, ..., the second support 12 carries electrodes 15$_a$, 15$_b$, ... at its upper half facing the first support 11. The second support 12 is further provided with line electrodes 16$_a$, 16$_b$, ... at its lower half facing the third support 13. The third support 13 carries column electrodes 17$_a$, 17$_b$, .... Therefore, the two-layer matrix type can offer a duty ratio twice as large as in the other types but has certain inherent problems.

(a) The cell structure is of the two-layer type and causes a parallax. To avoid this, the intermediate support of the three supports should be as thin as possible. These supports are conventionally made of glass material, and a thin and fragile glass plate is rather difficult and dangerous to handle during the manufacture.

(b) The thin glass plate is also difficult and dangerous to handle in leading the line electrodes carried thereon to a driver circuit.

(c) When it is desired to lead the respective electrodes from the opposite edges of the glass plate, alternatively with respect to each other, it is necessary to lead the electrodes from eight points so that there is a possibility of overlapping some electrodes with each other and causing complexity in the electrode lead assembly.

Figure 4A:
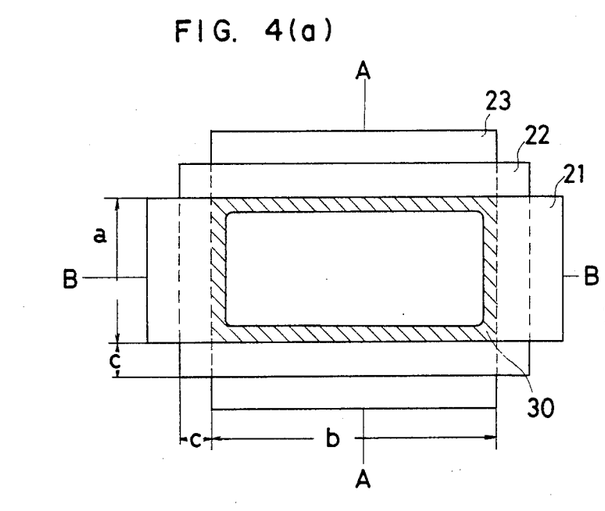
FIGS. 4(a) through 4(c) are a plan view, a cross sectional view taken along the line A—A of FIG. 4(a), and a cross sectional view taken along the line B—B of FIG. 4(a), respectively, showing a two-layer matrix type liquid crystal display panel according to one preferred form of the present invention.
Figure 4B:
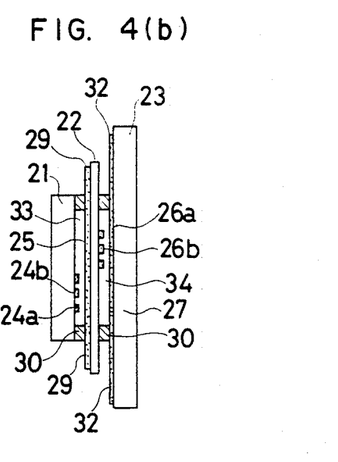
Figure 4C:
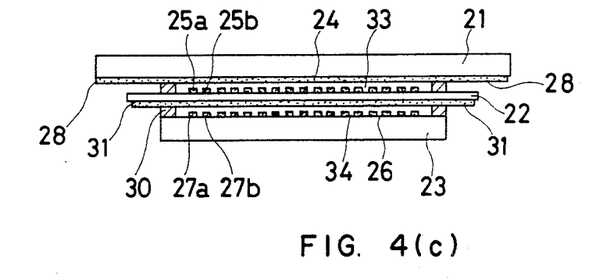
Figure 5:
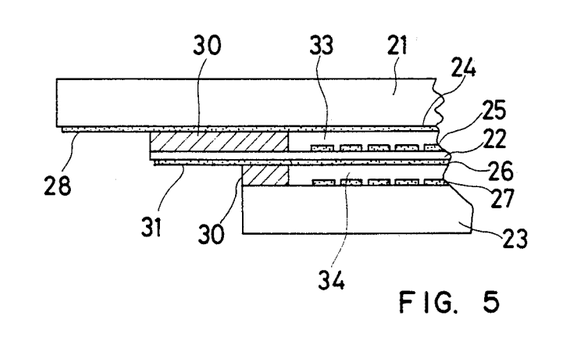
FIG. 5 is a cross sectional view of a sealing element in FIGS. 4(a) through 4(c)

According to the present invention, those packaging problems are overcome by providing an electrode lead as shown in FIGS. 4(a) through 4(c) wherein FIG. 4(a) is a plan view of a two-layer matrix type liquid crystal display panel constructed in accordance with one preferred form of the present invention, FIG. 4(b) is a cross-sectional view taken along the line A—A and FIG. 4(c) is a cross-sectional view taken along the line B—B.

Dimensions of the three transparent glass supports 21, 22, 23 are selected in accordance with TABLE 1 wherein a and b are the height and width of a display area (including a seal 30) and c is the width of electrode lead or terminal areas. It will be noted that c is not necessarily equal for all of the electrode lead areas.

TABLE 1

| | GLASS DIMENSION | |
|---|---|---|
| | HEIGHT | WIDTH |
| glass support 21 | a | b + 4c |
| glass support 22 | a + 2c | b + 2c |
| glass support 23 | 2a + 4c | b |

The glass support 21 is provided with the line electrodes 24$_a$, 24$_b$, ... only at the lower half thereof. The second support 22 is provided at the viewing side thereof with the column electrodes 25$_a$, 25$_b$, ... and the upper half of the opposed side thereof with the line electrodes 26$_a$, 26$_b$, .... The third and last support 23 carries the column electrodes 27$_a$, 27$_b$, ....

The electrodes areas 28, 28 for the electrode lead 24 are located at both sides of the lower half of the support 21. The electrode lead areas 29, 29 for the electrode 25 are located at the top and bottom of the viewing side of the support 22, while the electrode lead areas 31, 31 for the electrode 26 are located at both opposite sides of the upper half of the support 22. The electrode lead areas 32, 32 for the electrode 27 are located at the top and bottom of the support 23.

Liquid crystal material 33 is injected between the supports 21, 22 to complete the first layer liquid crystal cell and liquid crystal material 34 between the supports 22, 23 to complete the second layer liquid crystal cell.

As a result, the liquid crystal panel of the present invention described above bears the electrode array of FIG. 2(a) in a plan view and takes a form of the two-layer matrix display panel cell as viewed from FIG. 3 in a cross sectional view.

In summary, the liquid crystal display panel of the present invention comprises a predetermined number of supports disposed sequentially with a first dimension of the respective supports being sequentially longer and a second dimension thereof in a perpendicular direction being sequentially shorter. The intermediate thin glass support is sandwiched between two relatively thick supports. The electrode lead areas 29 of the thin glass support 22 face away from the rear support 23 and the other electrode lead areas 31 face away from the front support 21. Provision of the seal 30 extending below the electrode lead areas 31 affords the support 22 the same mechanical rigidity as the supports 21, 23. The support 22 will therefore not be destroyed or split even if the electrode lead areas 29, 31 are externally connected by means of a flexible sheet or an electrode pin. All of the respective electrode lead areas which are dispersed at the eight different points are never overlapped with respect to each other. As noted earlier, while the present panel is capable of increasing the number of the actuable picture elements as compared with the prior art panel with the same degree of multiplexing, it still suffers from the problem that there is a potential difference at the terminal areas with weak bonding therebetween.

The present invention provides a remarkable improvement in the above described terminal assembly which ensures simple and efficient connections with the respective terminals of the liquid crystal panel by adopting a complementary configuration of a circuit board (typically, glass epoxy or ceramic) with respect to the terminals of the liquid crystal display panel.

Figure 6:
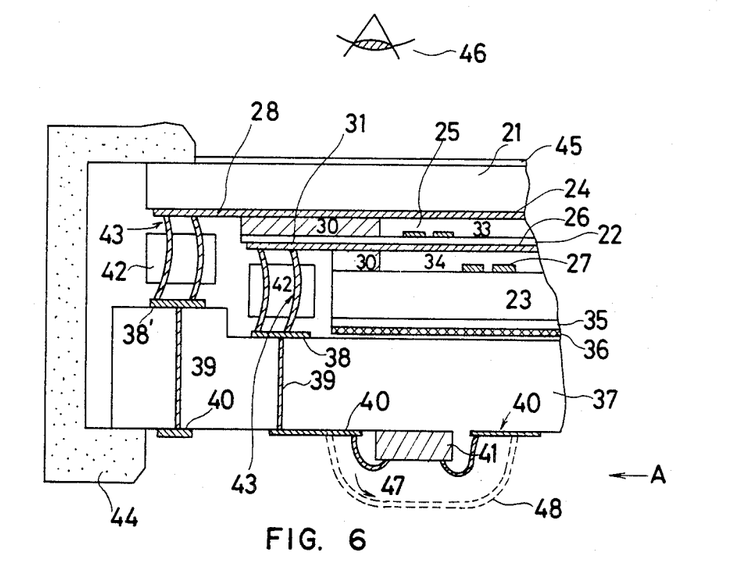
FIG. 6 details the one preferred form of the present invention shown in FIG. 5.

FIG. 6 shows a representative multi-layer liquid crystal display panel of the twisted nematic display mode according to one preferred form of the present invention flanked with a pair of polarizers 45 and 35 and a reflective plate 36. The reflective plate 36 may be positioned directly on a printed circuit board 37. Preferably, the printed circuit board of the multi-layer structure comprises a ceramic plate with a high resolution of printing conductors. Contact pads 38, and 38' which may comprise a highly conductive material such as Au are disposed in position to correspond to terminals of the display panel. As stated briefly above, the pads 38 and 38' are arranged in a complementary fashion with respect to the stepwise terminal assembly of the liquid crystal display panel. Through-hole connectors 29 connect signals appearing at the pads 38 and 38' through conductors 40 and wire bondings 47 on the opposite side of the circuit board to a driver circuit 41. A protective seal 48 is provided to protect those wire bondings. Disposed between the lead terminals 28 of the liquid crystal display panel and the terminal pads 38 and 38' on the circuit board is a unidirectionally conductive rubber sheet 42 such as Type 1705 of Chomerics Inco., H grade of Oki Electric Wire Co., polymer type AF of Shin-Etsu Polymer Co, or Toray's elastic connectors, etc. As is known in the art, the elastic connector 42 includes a predetermined number of conductive sections for connections between the liquid crystal display panel and the circuit board.

Figure 7:
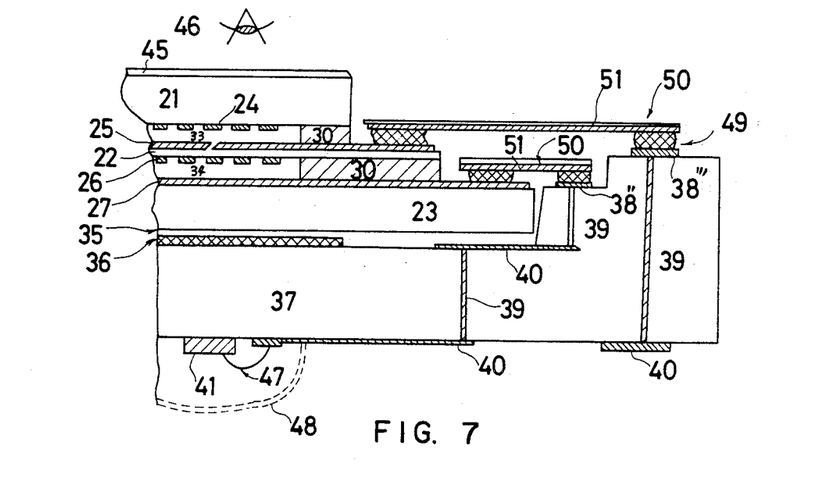
FIG. 7 is a cross sectional view taken along the direction of arrow A.

FIG. 7 is a cross-sectional view taken in the direction of arrow A in FIG. 6 wherein pads 38" and 38''' are also made of a conductive material suitable for soldering such as Au, Ni and Cu. Solder bondings bridge respective paths between the pads and associated flexible films 50 having conductors 51 adhered thereto and connected to the liquid crystal display panel. Since the pads 38" and 38''' are not flush with each other, they do not interfere with each other electrically or mechanically. The same type elastic connector is used for the pads 38" and 38''' as with the pads 38 and 38'.

As stated above, there is a positional difference between the terminal pads 38, 38', 38" and 38''' on the circuit board 37, thus providing simplicity and compactness of external connections of the terminals of the liquid crystal display panel.

Figure 8:
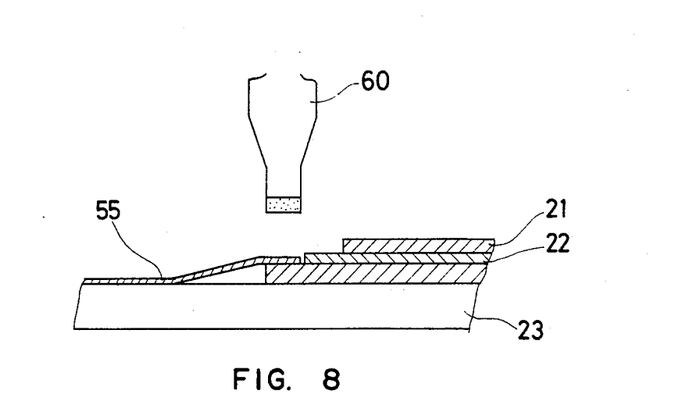
FIG. 8 is a cross sectional view for the use of an alternative for a conventional flexible wiring sheet, i.e., a flexible sheet with a patterned adhesive ("heat seal" trade name)
Figure 9:
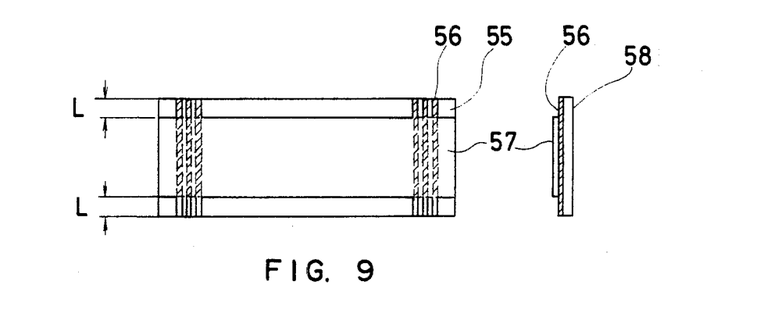
FIG. 9 is a plan view of the heat seal sheet.
Figure 10:
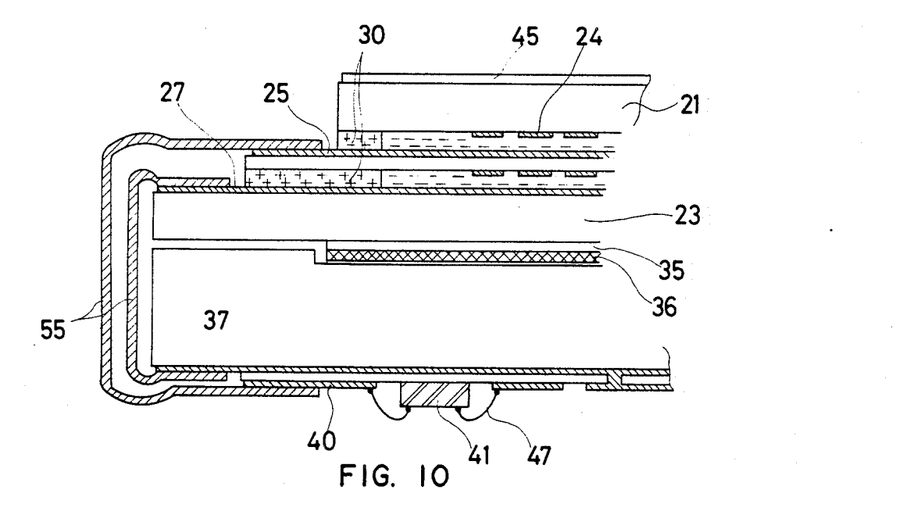
FIG. 10 is a cross sectional view along the line A—A in FIG. 4(a) for column connections.
Figure 11:
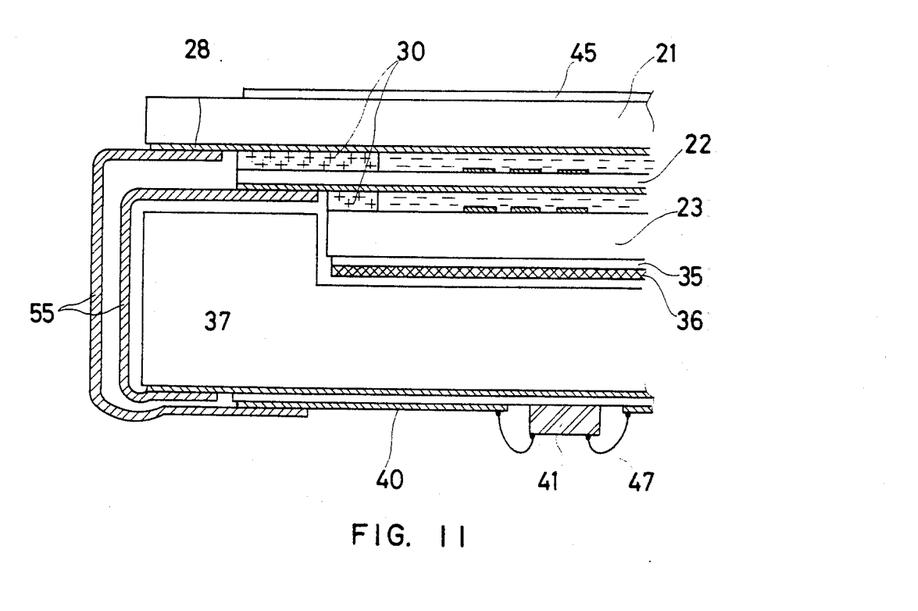
FIG. 11 is a cross sectional view along the line B—B in FIG. 4(b)

FIG. 8 shows an alternative way to connect the terminals of the liquid crystal display panel using a flexible sheet 55 with a patterned adhesive (for example, "heat seal" by Nippon Graphite Industry Ltd.) which is to be pressed and bonded with a heating and bonding machine 60. An example of the heat adhesive circuit sheet 55 is illustrated in FIG. 9 which comprises peripheral portions L to be connected to the display panel, a predetermined number of conductive areas 56 as defined by the slant line and non-conductive areas 57. The sheet 55 is disposed with its conductive areas in position registering with the patterned terminals of the display panel and then heated under pressure at about 180° C. The adhesive sheets 55 are connected to the column and row terminals of the display panel in the above stated manner and thereafter may wound around the rear surface of the rigid circuit board 37 carrying the display panel. In the given example, the circuit board comprises a ceramic plate which is advantageous in multi-layer connection, adhesion to the flexible adhesive sheet and to the glass substrates. The panel after being connected via the flexible adhesive sheet is shown in FIG. 10 and FIG. 11 with respect to the column and row connections. Multi-layer connection may be accomplished such that first-layer column terminals are connected to a first layer wiring pattern of the ceramic plate and second-layer column terminals to a second-layer wiring pattern of the ceramic plate. This procedure is applied to second-layer column connection. This is the case with the multi-layer row connection.

Figure 12:
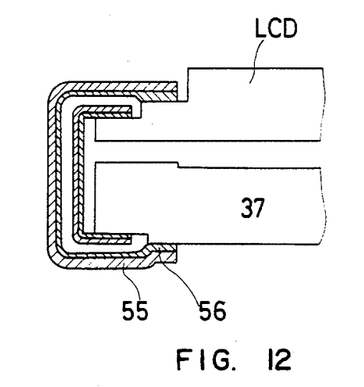
FIG. 12 details the column connections along the line A—A.
Figure 13:
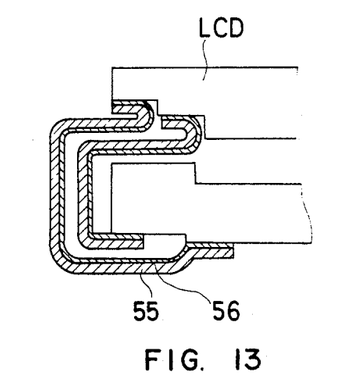
FIGS. 13 and 14 detail the row connections along the line B—B.
Figures 14, 15:
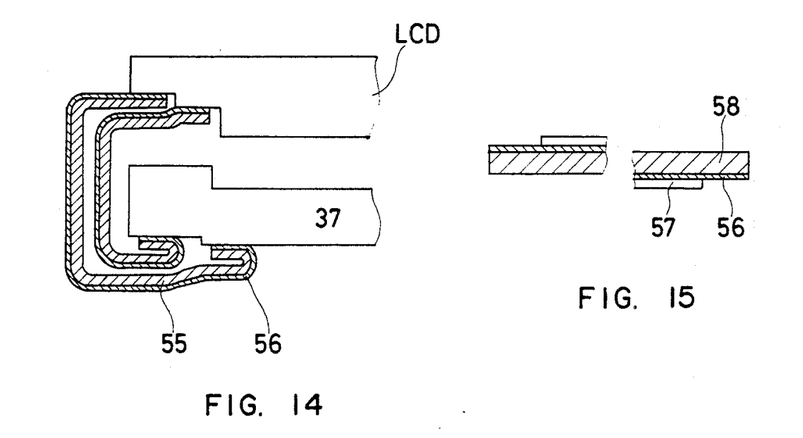
FIG. 15 is a diagram for explanation of a heat seal sheet with terminal electrodes disposed on opposite sides via a base sheet.
Figure 16:
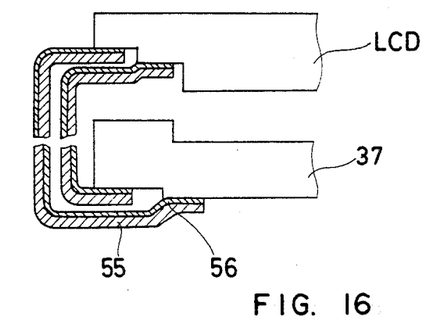
FIG. 16 details the row connections along the line B—B.
Figure 17:
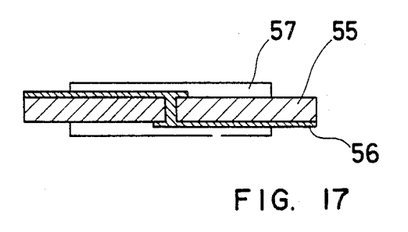
FIG. 17 is a cross sectional view for explanation of the heat seal sheet with through-holes.
Figure 18:
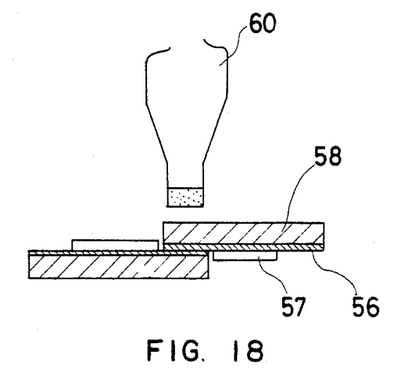
FIG. 18 shows the bonding and connecting of the heat seal sheet.

The structure of the flexible adhesive sheet connection between the liquid crystal display panel and the rigid circuit board will now be discussed in more detail. The adhesive thereon is screen printed and may include aligned terminals on opposite sides of a base film 58. For the column connections as in FIG. 10 the flexible sheet 55 can be used as shown in FIG. 12 with the terminals on the panel and the ceramic plate omitted. Nevertheless, for the row connection as shown in FIG. 11, the adhesive sheet 55 should be modified into a folded-over form shown in FIGS. 13 and 14 since the terminal surfaces on the panel extend in the opposite direction. As an alternative, provided that the adhesive sheet 55 carries terminals extending on opposite sides, as shown in FIG. 15, it is possible to connect both in the manner as shown in FIG. 16. One way to make the sheet of FIG. 15 is by forming through-holes, as shown in FIG. 17. However, this creates some difficulty when a multiline, high density panel is to be connected. Another effective measure is splitting the adhesive sheet 55 of FIG. 9 and connecting two segments of the adhesive sheet 55 via heat bonding as depicted in FIG. 18.

While only certain embodiments of the present invention have been described, it will be apparent to those skilled in the art that various changes and modifications may be made therein without departing from the spirit and scope of the invention as claimed.

What is claimed is:

1. A display device comprising:
   a predetermined number of supports stacked sequentially on top of each other;
   liquid crystal material between said supports defining a liquid crystal cell between each two adjacent supports;
   said supports having a first dimension which is progressively larger in said sequentially stacked supports and a second dimension, in a direction perpendicular to said first dimension, which is progressively smaller in said sequentially stacked supports, whereby said supports define upper and lower surfaces extending outwardly from said liquid crystal cells;
   a matrix electrode pattern in each of said cells comprising electrodes having terminal portions extending outwardly from said cells onto said outwardly extending upper and lower surfaces;
   a circuit board means having terminals thereon positioned beneath said stack of supports;
   said terminals on said circuit board facing said terminal portions on said outwardly extending lower surfaces and said terminal portions on said outwardly extending upper surfaces facing away from said circuit board;
   flexible elastomeric means for electrically connecting said terminal portions on said outwardly extending upper end lower surfaces to said terminals on said circuit board;
   wherein said flexible elastomeric means comprises a flexible elastomeric conductor interposed between said terminal portions on said lower surfaces and said terminals of said circuit board and at least one flexible conductive sheet connecting said terminal portions on said upper surfaces to the terminals on said circuit board;
   wherein said circuit board has a stepped configuration and at least some of said terminals on said circuit board are on different portions of said stepped configuration and at positions corresponding substantially to the positions of said respective upper surfaces, wherein said flexible conductive sheets extend between said respective upper surfaces and said stepped portions in substantially parallel planes.

2. A display device according to claim 1 wherein the elastomeric means comprises a unidirectional conductive elastomer which includes metal or conductive powders in elastic material.

3. A display device according to claim 1 wherein said circuit board carries a reflective coating.

4. A display device according to claim 1 wherein said elastomeric means comprises a flexible sheet having a patterned adhesive.

5. A display device according to claim 4 wherein said terminals of said display and said circuit board are connected by heat bonding of said flexible sheet.

6. A display device according to claim 1 wherein said circuit board comprises a ceramic plate.

7. A display device comprising:

a predetermined number of supports stacked sequentially on top of each other;

liquid crystal material between said supports defining a liquid crystal cell between each two adjacent supports;

said supports having a first dimension which is progressively larger in said sequentially stacked supports and a second dimension, in a direction perpendicular to said first dimension, which is progressively smaller in said sequentially stacked supports, whereby said supports define upper and lower surfaces extending outwardly from said liquid crystal cells;

a matrix electrode pattern in each of said cells comprising electrodes having terminal portions extending outwardly from said cells onto said outwardly extending upper and lower surfaces;

a circuit board means having terminals thereon positioned to one side of said stack of supports; and flexible elastomeric means for electrically connecting said terminal portions on said outwardly extending upper and lower surfaces to said terminals on said circuit board;

wherein said circuit board has a stepped configuration and at least some of said terminals on said circuit board are on different portions of said stepped configuration and at positions corresponding substantially to the positions of said respective upper surfaces, wherein said flexible elastomeric means extend between said respective upper surfaces and said stepped portions in substantially parallel planes.

* * * * *